US008846175B2

(12) United States Patent
Hsu

(10) Patent No.: US 8,846,175 B2
(45) Date of Patent: Sep. 30, 2014

(54) LIGHT TRANSMISSIVE FILM AND FABRICATION METHOD OF LIGHT TRANSMISSIVE FILM

(75) Inventor: Yu-Ju Hsu, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 432 days.

(21) Appl. No.: 12/852,527

(22) Filed: Aug. 9, 2010

(65) Prior Publication Data

US 2011/0064910 A1 Mar. 17, 2011

(30) Foreign Application Priority Data

Sep. 11, 2009 (CN) .......................... 2009 1 0306923

(51) Int. Cl.

| | |
|---|---|
| ***B32B 5/12*** | (2006.01) |
| ***B82Y 30/00*** | (2011.01) |
| ***G06F 3/044*** | (2006.01) |
| ***B82Y 20/00*** | (2011.01) |

(52) U.S. Cl.

CPC ................. *G06F 3/044* (2013.01); *B82Y 30/00* (2013.01); *B82Y 20/00* (2013.01); *Y10S 977/742* (2013.01); *Y10S 977/902* (2013.01)

USPC ........... 428/114; 428/408; 977/742; 977/902; 252/500; 252/501.1; 423/447.1; 423/447.2; 423/448

(58) Field of Classification Search

CPC ........ B82Y 20/00; B82Y 30/00; G06F 3/044; G06F 1/13338; G02F 1/13338

USPC ........... 428/114, 408; 427/532; 977/742, 902; 252/500, 501; 423/447.1, 447.2, 448

See application file for complete search history.

(56) References Cited

U.S. PATENT DOCUMENTS

| | | | | |
|---|---|---|---|---|
| 6,912,031 | B2 * | 6/2005 | Ohnishi | 349/123 |
| 2002/0008899 | A1 * | 1/2002 | Tanaka et al. | 359/315 |
| 2002/0051894 | A1 * | 5/2002 | Yoshikawa | 428/690 |
| 2003/0122111 | A1 * | 7/2003 | Glatkowski | 252/500 |
| 2004/0047038 | A1 * | 3/2004 | Jiang et al. | 359/486 |
| 2005/0042430 | A1 * | 2/2005 | Toyoda | 428/209 |
| 2005/0209392 | A1 * | 9/2005 | Luo et al. | 524/496 |

OTHER PUBLICATIONS

Slepyan, G., Maksimenko, S., Lakhtakia, A., Yevtushenko, O., Gusakov, A., "Electronic and electromagnetic properties of nanotubes", Apr. 15, 1998, The American Physical Society, vol. 57, No. 16, pp. 9485-9497.*

* cited by examiner

*Primary Examiner* — Aaron Austin
*Assistant Examiner* — Brian Handville
(74) *Attorney, Agent, or Firm* — WPAT, PC; Justin King

(57) ABSTRACT

A manufacturing method of a light transmissive film includes the following steps. A film is provided, and the film includes a plurality of nano-units and has a reference direction. In addition, a plurality of first stripes parallel to each other is formed on the film by an energy beam, and the first stripes are neither perpendicular nor parallel to the reference direction.

8 Claims, 18 Drawing Sheets

80
S1
S2
82
70
210
D1
100
60
50
θ
D1
R1
L1

LIGHT TRANSMISSIVE FILM AND FABRICATION METHOD OF LIGHT TRANSMISSIVE FILM

BACKGROUND OF DISCLOSURE

1. Field of the Disclosure

The present disclosure generally relates a film and the manufacturing method thereof, and more particularly, to a light transmissive film and the manufacturing method thereof.

2. Description of Related Art

Along with the development of the displaying technology and multimedia technology, the typical bottom or mouse interface has been unsatisfied for the user. Since the portable electronic device is generally used, manufacturers have been pursued a user interface which is more easy to operate and more intuitive, and occupies less space. The touch panel is one of the devices which can achieve these effects.

The typical touch panels are generally categorized into capacitive touch panels and resistive touch panels. The resistive touch panel adopts two indium tin oxide (ITO) films. When the user presses the resistive touch panel by a finger, the two ITO films contact with and are electrically connected with each other. In this way, a processing unit can calculate the position pressed by the finger.

The ITO film in the capacitive touch panel is divided into a plurality of patterns. When the user contacts the capacitive touch panel by a finger, the capacitance between the patterns is changed, whereby a processing unit calculates the position pressed by the finger.

However, the patterns on the capacitive touch panel may lead the frame to be non-uniform. Besides, when the ITO film is bent unduly or bent too many times, it is easy to generate cracks on the ITO film or deteriorate the ITO film. Therefore, when the ITO film is used in a flexible panel, it is easy to decrease the reliability of the flexible panel.

SUMMARY OF THE DISCLOSURE

An embodiment of the disclosure provides a manufacturing method of a light transmissive film which includes following steps. A film is provided, and the film includes a plurality of nano-units and has a reference direction. In addition, a plurality of first stripes parallel to each other is formed on the film by an energy beam, and the first stripes are neither perpendicular nor parallel to the reference direction.

Another embodiment of the disclosure provides a light transmissive film formed by the above manufacturing method of the light transmissive.

Yet another embodiment of the disclosure provided a light transmissive film including a plurality of nano-units and a plurality of first stripes parallel to each other. The nano-units form a film. The first stripes are located on a surface of the film, and the first stripes are neither perpendicular nor parallel to a reference direction of the film.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
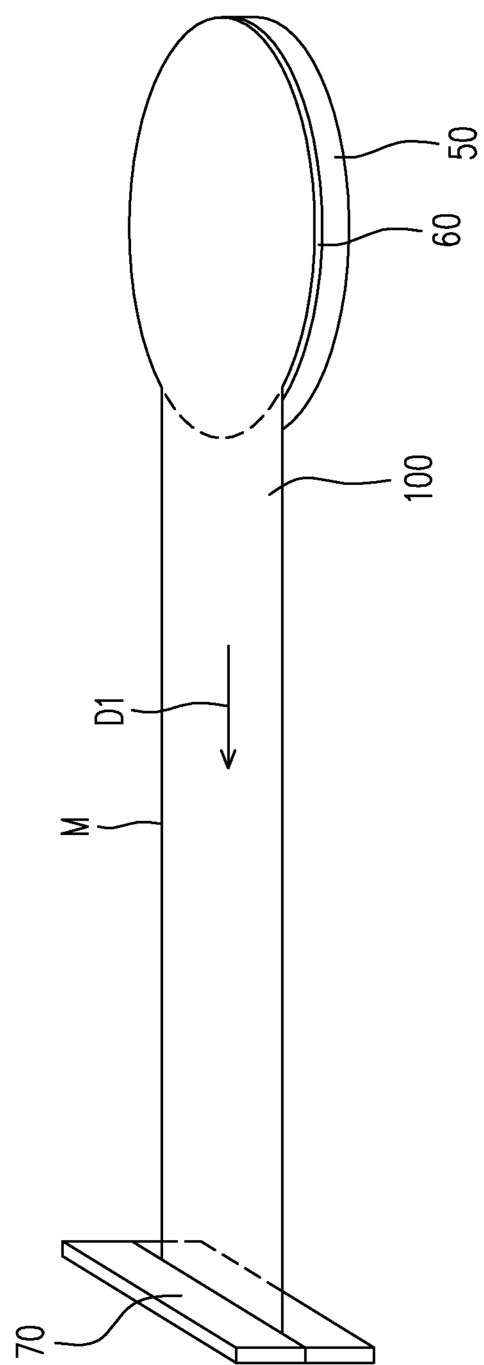
FIGS. 1 through 4 are schematic views showing the procedure of a fabricating method of a light transmissive film according to an embodiment of the disclosure.

FIGS. 1 through 4 are schematic views showing the procedure of a fabricating method of a light transmissive film according to an embodiment of the disclosure. The manufacturing method of the light transmissive film according to this embodiment includes steps as follows. Referring to FIG. 1, first, a film 100 is provided, and the film 100 includes a plurality of nano-units and has a reference direction D1. In this embodiment, the nano-units are, for example, a plurality of carbon nanotubes, and the film 100 is, for example, a carbon nanotube films. However, in other embodiments, the nano-units may be nano-scale electrically conductive molecules or grains, e.g. nano-scale metal grains. In this embodiment, from a macroscopic view, the film 100 is an electrically conductive film having anisotropic impedance, and a main conductive direction (along which the impedance is smallest) of the electrically conductive film having anisotropic impedance is substantially parallel to the reference direction D1. From a microscopic view, the carbon nanotubes extend about along the reference direction D1.

In this embodiment, the step of providing the film 100 includes steps as follows. First, a carbon nanotube layer 60 is formed on a substrate 50. The substrate 50 is a silicon substrate, a quartz substrate, or other suitable substrates, for example. The carbon nanotube layer 60 is, for example, formed by chemical vapor deposition (CVD) or other suitable methods. Next, a side of the carbon nanotube layer 60 is pulled and the carbon nanotube layer 60 is stretched along a stretching direction (i.e. the reference direction D1 in this embodiment) so as to form a stretched carbon nanotube film. Specifically, a clip 70 is used to clip the side of the carbon nanotube film and pull out the carbon nanotube film from the substrate 50 laterally. When the carbon nanotube film is pulled out, the carbon nanotubes therein extend about along the reference direction D1. In this embodiment, the reference direction D1 is, for example, the stretching direction of the film 100. However, the reference direction D1 may be substantially parallel to a side M of the film 100.

Figure 2:
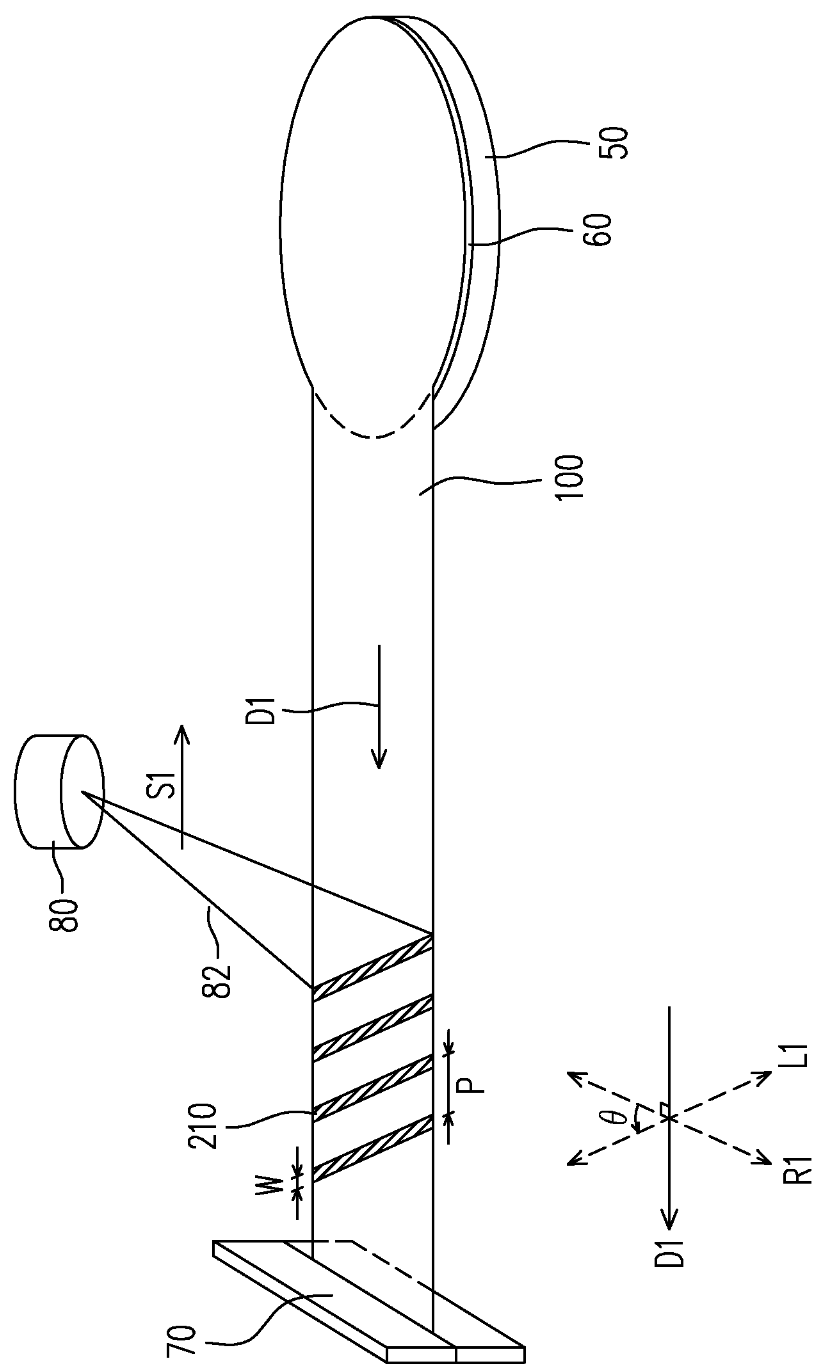

Referring to FIG. 2, after that, the film 100 is struck by an energy beam 82 so as to form a plurality of first stripes 210 parallel to each other on the film 100, and the first stripes 210 are neither perpendicular nor parallel to the reference D1. There is a difference between the first stripes 210 and the structures not struck by the energy beam 82 and respectively adjacent to the first stripes 210. The difference may be a physical difference, a structural difference, or an optical difference. For example, the difference is a texture difference, a density difference of the nano-units, a difference of surface roughness, a thickness difference (i.e., the first stripes are recessed stripes), a structural difference of the nano-units (e.g. the difference between a double wall carbon nanotube and a single wall carbon nanotube), a phase difference between the nano-units, a intensity difference of reflective light (e.g. the brightness contrast due to the reflective light from the first stripes 210 and the adjacent structures), a intensity difference of transmissive light (e.g. the brightness contrast due to the transmittance difference between the first stripes 210 and the adjacent structures), or a intensity difference of diffractive light. In this embodiment, the extending direction L1 of the first stripes 210 is inclined with respect to a reference direction R1 by an angle θ. The reference direction R1 is in the surface of the film 100 and perpendicular to the reference direction D1, and θ is greater than 0 degree and less than 90 degrees. However, in other embodiments, θ may be less than 0 degree and greater than −90 degrees. That is to say, the inclination direction of the extending direction L1 with respect to the reference direction R1 is opposite to the direction shown by the arrow near the letter θ in FIG. 2. The energy beam 32 is, for example, a laser beam emitted by a laser source 80, and the wavelength thereof falls within the range of visible light, ultraviolet light, infrared light, or other electromagnetic waves, by which the disclosure is not limited. However, in other embodiments, the energy beam 82 may be a particle beam having kinetic energy, for example, an electron beam, a proton beam, a helium nucleus beam, or other suitable particle beams.

In this embodiment, the step of forming the first stripes 210 by the energy beam 82 includes scanning the film 100 along a scanning direction S1 parallel to the reference direction D1 (the scanning direction S1 is opposite to the reference direction D1 in this embodiment) by the energy beam 82, so as to form the first stripes 210 in sequence. In this embodiment, the first stripes 210 are periodically arranged, for example, arranged at equal intervals or arranged with other periodical forms. For example, the width W of the first stripes 210 is, for example, about 110 microns, and the pitch P of the first stripes 210 falls within the range of 200 microns to 350 microns, by which the disclosure is not limited.

Figure 3:
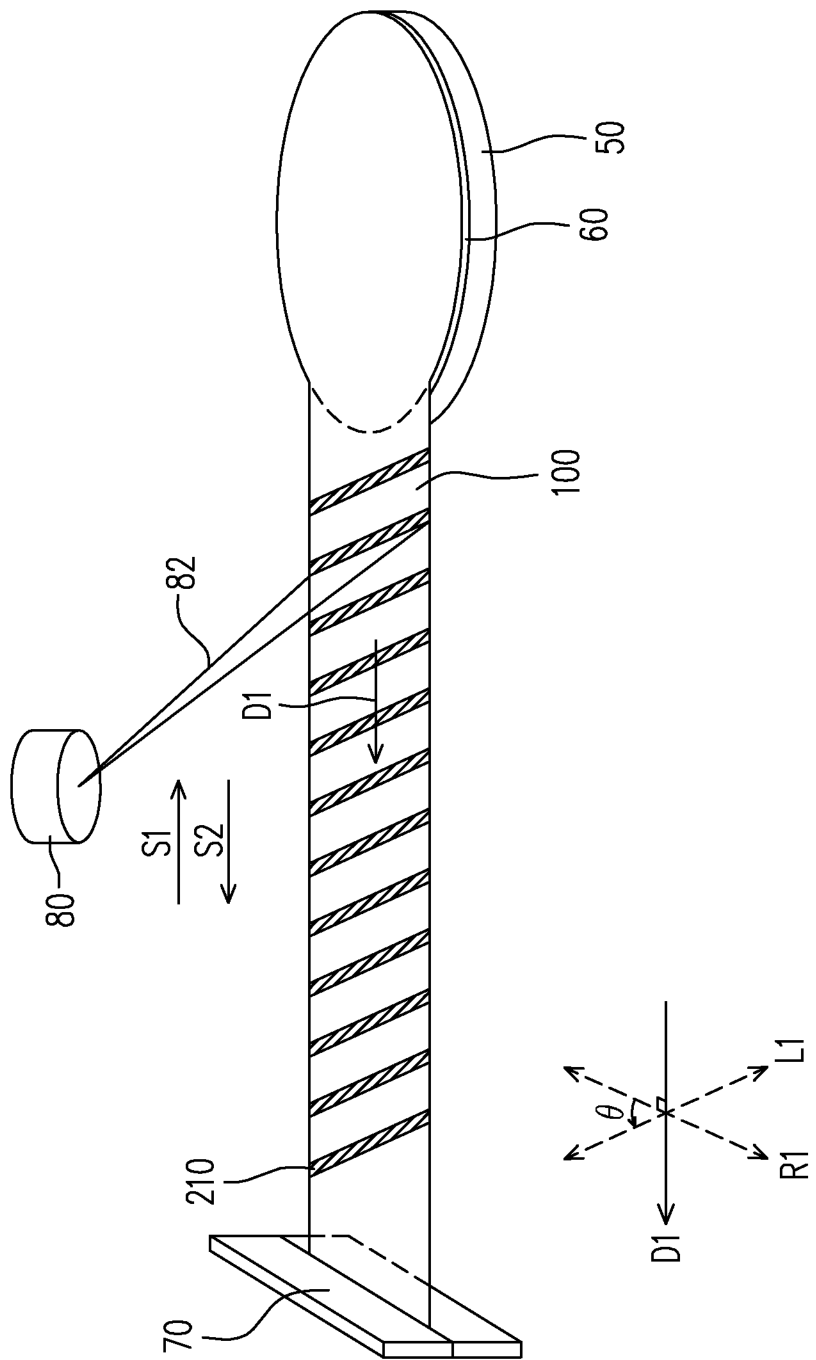

Referring to FIG. 3, afterward, the manufacturing method of the light transmissive film may include repeatedly scanning the positions of the first stripes 210 along scanning directions S1 and S2 (the scanning direction S2 is the same as the reference direction D1) parallel to the reference direction D1 by the energy beam 82, so as to enhance the difference between the first stripes 210 and the structures not struck by the energy 82 and respectively adjacent to the first stripes 210, for example, to increase the recessed depth of the first stripes 210, to increase the texture difference, to increase the density difference of the nano-units, to increase the difference of surface roughness, to increase the structural difference of the nano-units, to increase the phase difference of the nano-units, to increase the intensity difference of reflective light, to increase the intensity difference of transmissive light, or to increase the intensity difference of diffractive light. In this embodiment, the scanning is performed back and forth along the scanning direction S1 and S2 alternately many times, so as to increase the recessed depth of the first stripes 210. However, in other embodiments, when the scanning is performed back and forth along the direction S1 and S2 alternately by the energy beam 32, the original positions of the stripes 210 formed previously may not be scanned repeatedly, but other positions shifted from the original positions are scanned.

Figure 4:
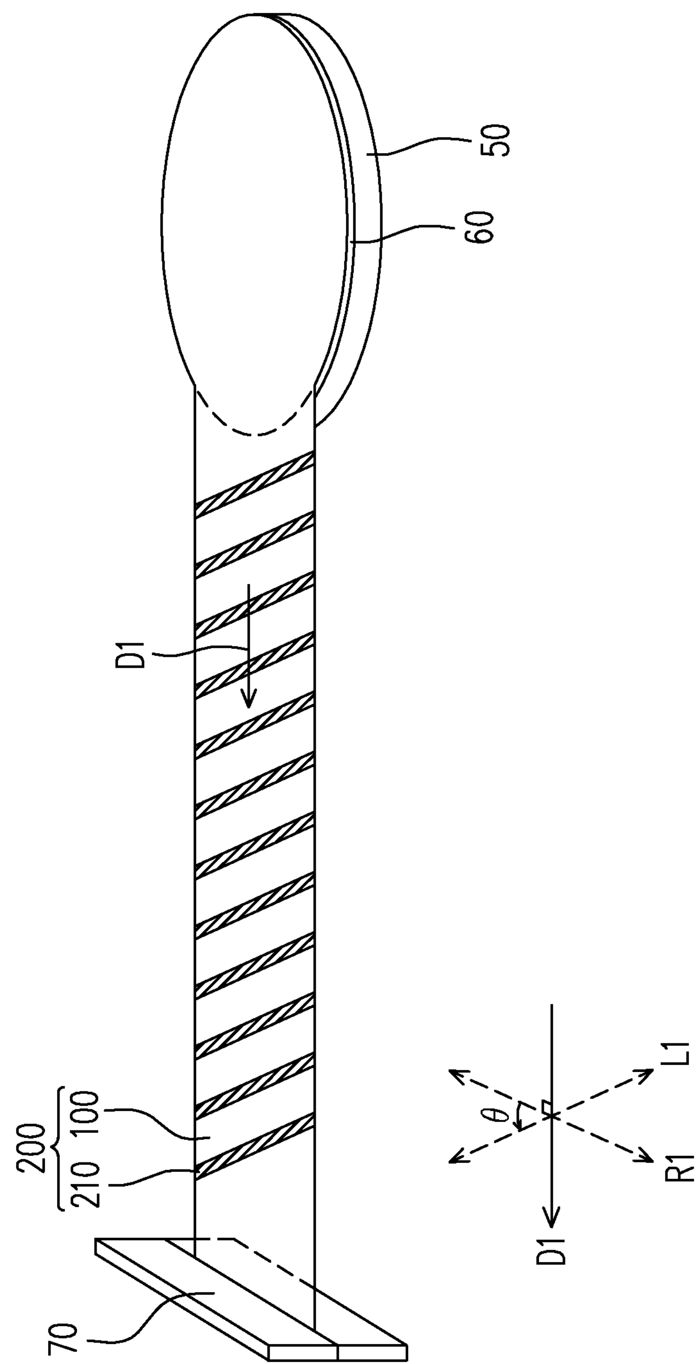

In this embodiment, the stripes 210 increase the transmittance of the film 100, so as to form a light transmissive film 200 as shown in FIG. 4. Specifically, the light transmissive film 200 includes the plurality of nano-units and the first stripes 210 as described hereinbefore. The nano-units form the film 100, and the first stripes 210 are located on the surface of the film 100.

In this embodiment, since the first stripes 210 are neither perpendicular nor parallel to the reference direction D1, the moiré formed by the first stripes 210 and other periodical structures, e.g. a pixel array of a display panel, is reduced or prevented by properly adjusting the extending direction L1 of the first stripes 210 (e.g. adjusting the angle θ), the width W, and the pitch P (as shown in FIG. 2).

Figure 5:
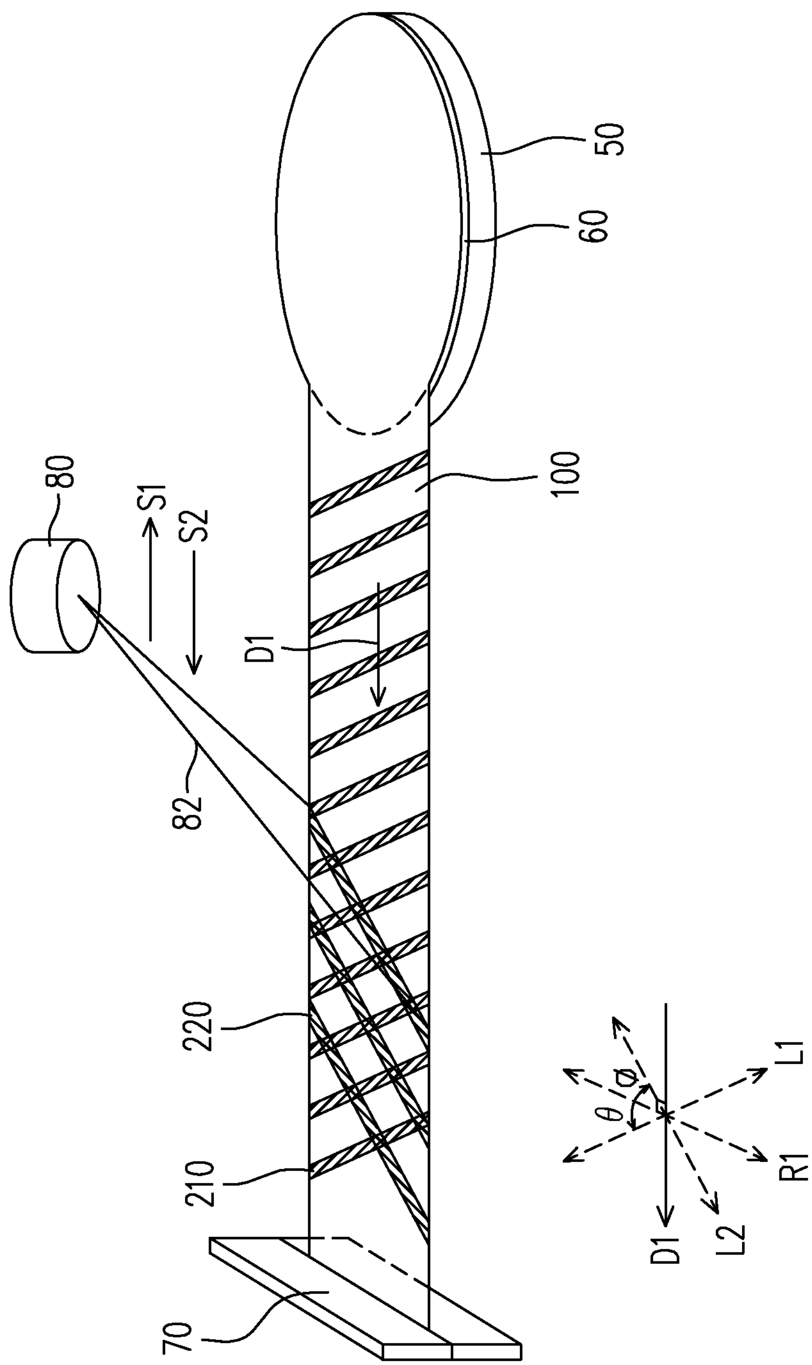
FIGS. 5 and 6 are schematic views showing the procedure of a fabricating method of a light transmissive film according to another embodiment of the disclosure.
Figure 6:
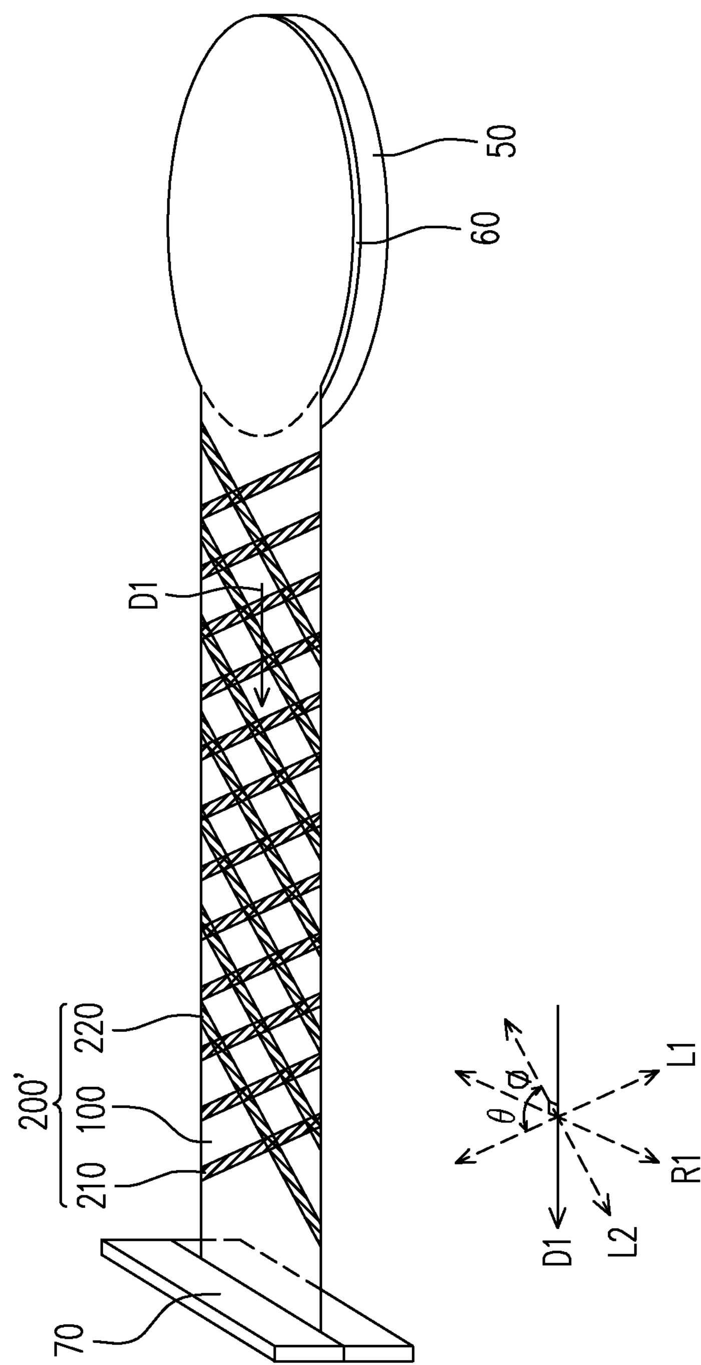

FIGS. 5 and 6 are schematic views showing the procedure of a fabricating method of a light transmissive film according to another embodiment of the disclosure. The manufacturing method of the light transmissive film of this embodiment is similar to the manufacturing method of the light transmissive film shown by FIGS. 1 through 4, and the main difference therebetween is as follows. Referring to FIG. 5, the manufacturing method of the light transmissive film according to this embodiment further includes forming a plurality of second stripes 220 on the surface of the film 100 by the energy beam 82, and each of the second stripes 220 is not parallel to each of the first stripes 210. The characteristic of the second stripes 220 is similar to that of the first stripes 210, and is not repeated herein. In addition, the second stripes 220 may be arranged periodically. In this embodiment, the extending direction L2 of the second stripes 220 is inclined with respect to the reference direction R1 by an angle ϕ, and ϕ is less than 0 degree and greater than −90 degrees. However, in other embodiments, one of ϕ and θ may be zero degree. In this embodiment, the width and the pitch of the second stripes 220 may be about the same as the width and the pitch of the first stripes 210. Besides, in this embodiment, the scanning may be performed along the scanning directions S1 and S2 back and forth many times by the energy beam 82, so as to increase the difference between the second stripes 220 and the structures respectively adjacent to the second stripes 220.

The first stripes 210 and the second stripes 220 increase the transmittance of the film 100, so as to form a light transmissive film 200'. In this embodiment, each of the first stripes 210 being not parallel to each of the second stripes 220 spoils the periodicity of each other, such that the user is not easy to observe the first stripes 210 and the second stripes 220 by naked eyes. Therefore, when the light transmissive film 200' of this embodiment is used to be an electrically conductive film of a touch panel, the quality, the brightness uniformity, and the color uniformity of displaying frames are improved. Additionally, the light transmissive film 200' according to this embodiment may be used to adhere to the windows or the heat insulating papers, such that the windows may have touch control function. Moreover, the light transmissive film 200' according to this embodiment may also be used to be an electrically conductive film of a flexible panel, e.g. a flexible display panel or a flexible touch display panel. Since the carbon nanotube film has better flexibility and is not easy to deteriorate due to being unduly bent or after being bent too many times, the reliability of the flexible panel is improved.

Furthermore, each of the first stripes 210 being not parallel to each of the second stripes 220 spoils the periodicity of each other, such that the first stripes 210 and the second stripes 220 are not easy to cause moiré with other periodical structures, e.g. a pixel array of a display panel. As such, when the light transmissive film of this embodiment is used to be an electrically conductive film of a touch display panel, the quality and the uniformity of the displaying frames are improved.

Figure 7:
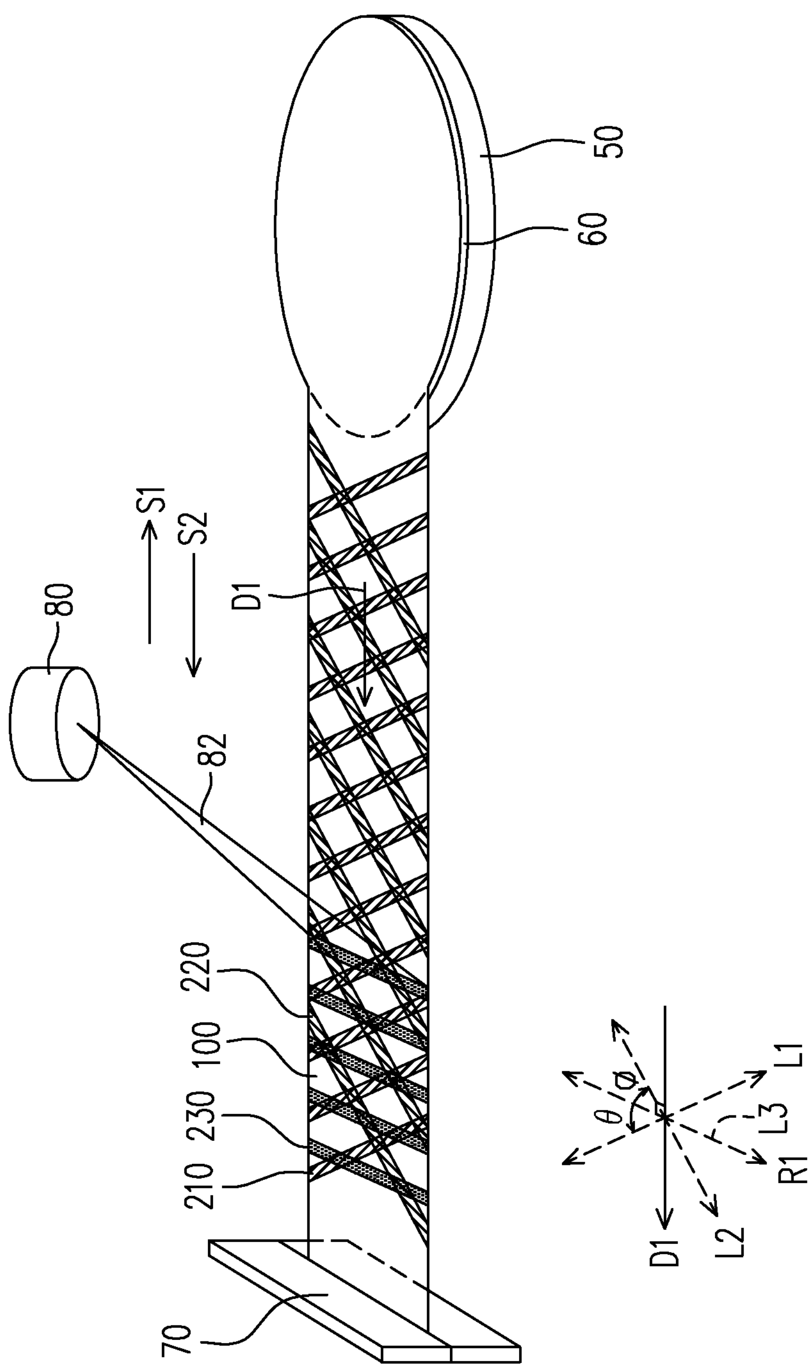
FIGS. 7 and 8 are schematic views showing the procedure of a fabricating method of a light transmissive film according to yet another embodiment of the disclosure.
Figure 8:
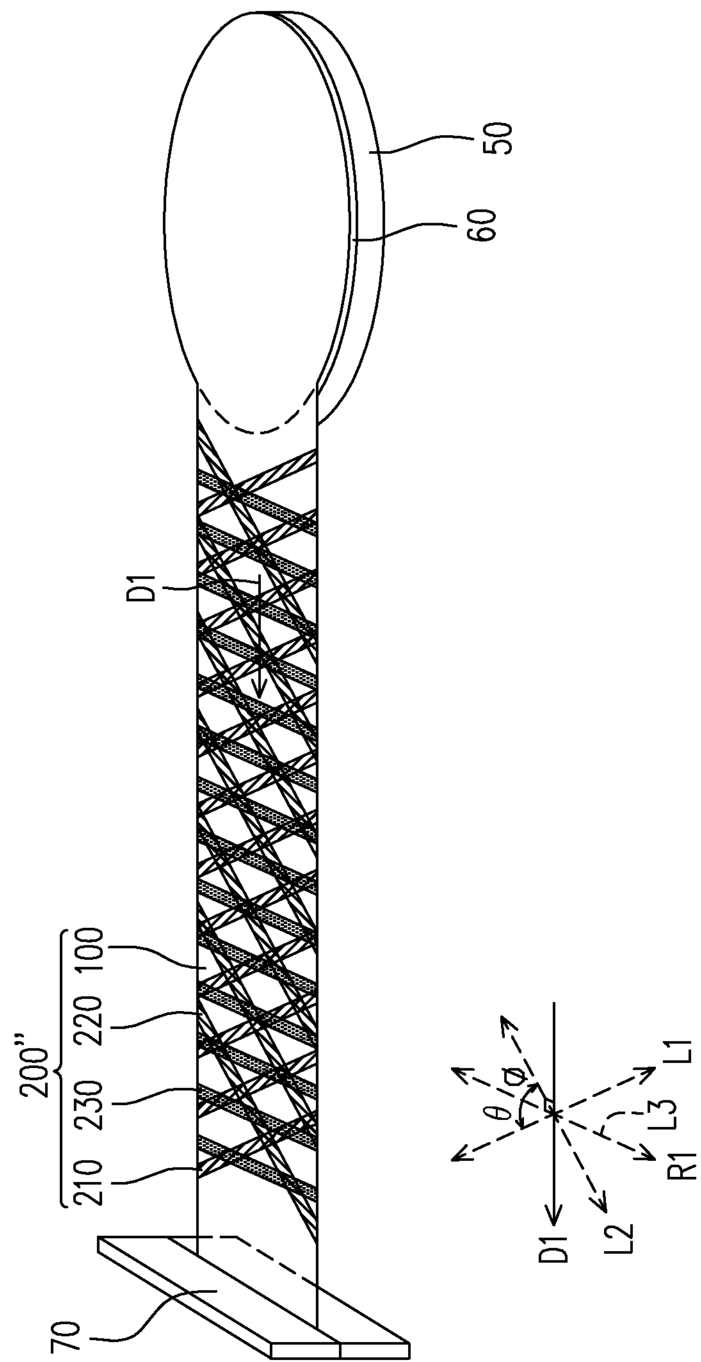

FIGS. 7 and 8 are schematic views showing the procedure of a fabricating method of a light transmissive film according to yet another embodiment of the disclosure. The manufacturing method of the light transmissive film of this embodiment is similar to the manufacturing method of the light transmissive film shown by FIGS. 5 and 6, and the main difference therebetween is as follows. Referring to FIG. 7, the manufacturing method of the light transmissive film according to this embodiment further includes forming a plurality of third stripes 230 on the surface of the film 100 by the energy beam 82, and each of the third stripes 230 is neither parallel to each of the first stripes 210 nor parallel to each of the second stripes 220. The characteristic of the third stripes 220 is similar to that of the first stripes 210 and that of the second stripes 220, and is not repeated herein. In addition, the third stripes 230 may be arranged periodically. In this embodiment, the extending direction L3 of each of the third stripes 230 is substantially parallel to the reference direction R1, i.e. inclined with respect to the reference direction R1 by zero degree, by which the disclosure is not limited. In this embodiment, the scanning may be performed along the scanning directions S1 and S2 back and forth by the energy beam 82, so as to increase the difference between the third stripes 230 and the structures respectively adjacent to the third stripes 230.

The first stripes 210, the second stripes 220, and the third stripes 230 increase the transmittance of the film 100, so as to form a light transmissive film 200". Since the light transmissive film 200" according to this embodiment has three sets of stripes respectively having different extending directions, i.e. the first stripes 210, the second stripes 220, and the third stripes 230, the periodicity of the stripes are spoiled more. In this way, the first stripes 210, the second stripes 220, and the third stripes 230 on the light transmissive film 200" is harder to be observe by naked eyes and harder to cause moiré with other periodical structures.

Figure 9:
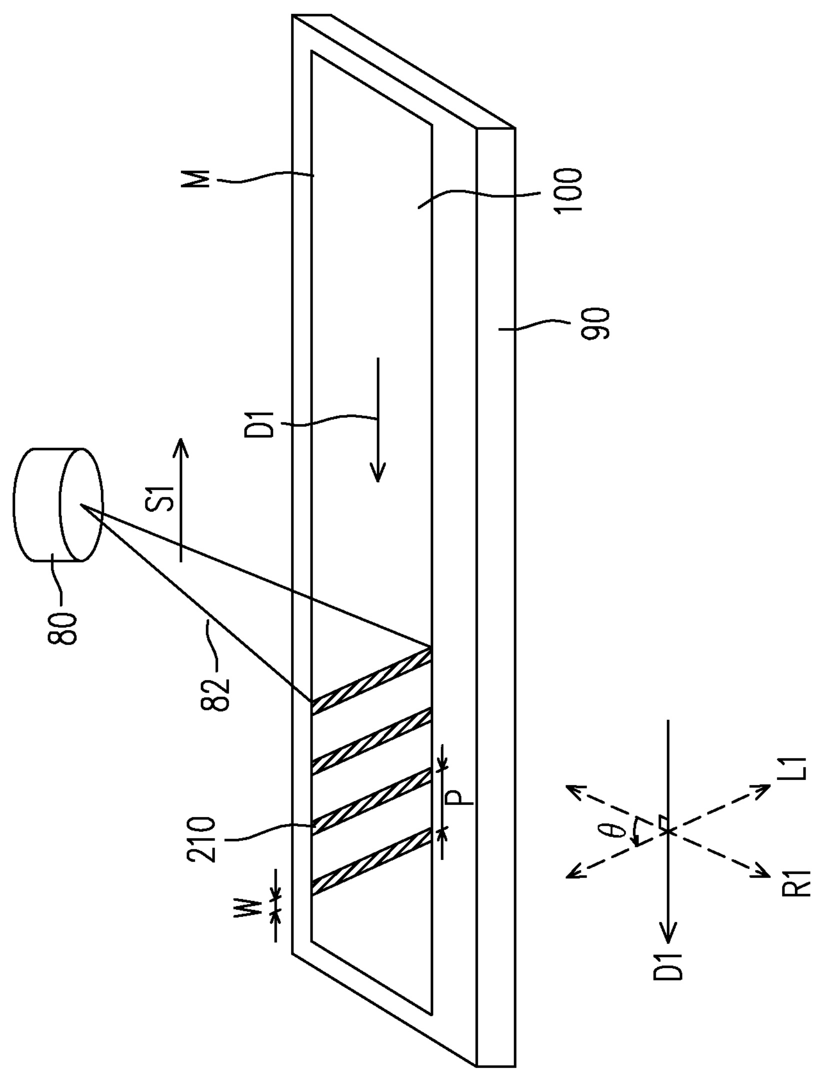
FIG. 9 is a schematic view showing a fabricating method of a light transmissive film according to still another embodiment of the disclosure.

FIG. 9 is a schematic view showing a fabricating method of a light transmissive film according to still another embodiment of the disclosure. Referring to FIG. 9, the manufacturing method of the light transmissive film of this embodiment is similar to the manufacturing method of the light transmissive film shown by FIGS. 1 through 4, and the main difference therebetween is as follows. In this embodiment, before the first stripes 210 are formed by the energy beam 82, the stretched film 100 is disposed on a carrier 90. In this embodiment, the carrier 90 is, for example, a resin or plastic substrate. After the film 100 is disposed on the carrier 90, the formation of the first stripes 210 is started. In this case, the reference direction D1 is substantially parallel to the side M of the film 100. The manufacturing method of the light transmissive film and the light transmissive film formed by this method have similar advantages and effects to those described in the above embodiments, and are not repeated herein.

Figure 10:
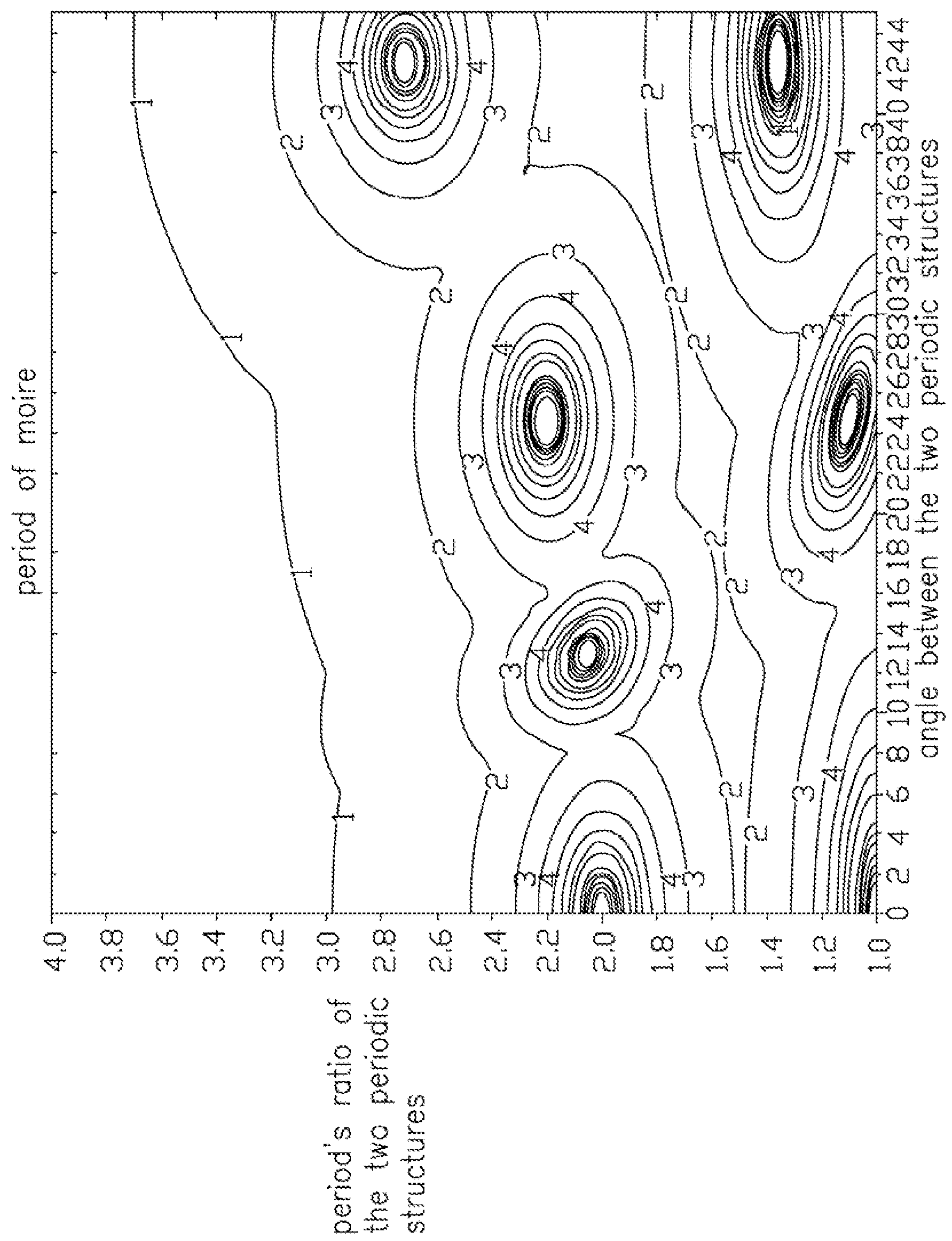
FIG. 10 is a schematic view showing that the stripes are observed by a naked eye.

FIG. 10 is a schematic view showing that stripes are observed by a naked eye away from the stripes by a distance A. Referring to FIG. 10, when the observing solid angle θ1 of the human eye observing the stripes is less than the solid angle corresponding to the contrast sensitivity, the naked eye can not recognize the stripes. On the contrary, when the observing solid angle θ1 of the human eye observing the stripes is greater than the solid angle corresponding to the contrast sensitivity, the naked eye is easier to recognize the stripes. On the other hand, when the smallest solid angle at which the human eye can recognize the stripes under a certain contrast condition is compared with the observing solid angle θ1, if the observing angle θ1 is smaller, the naked eye can not recognized moiré; otherwise, the naked can recognized moiré. The formulas to calculate the contrast sensitivity function (CSF) are as follows $$\text{Contrast} = \frac{\Delta l}{l_{ave}} = \frac{l_{max} - l_{min}}{l_{max} + l_{min}};$$

$$\text{Contrast Sensitivity} = 1/\text{Contrast};$$

where Δl is the difference between the largest brightness and the smallest brightness of the stripes; $l_{ave}$ is the average brightness of the stripes; $l_{max}$ is the largest brightness of the stripes; $l_{min}$ is the smallest brightness of the stripes.

Therefore, the embodiments of FIGS. 1 through 4, and 4 reduce the degree of moiré by controlling the contrast and contrast sensitivity caused by the first stripes 210 and the width and the pitch of the first stripes 210. Moreover, the embodiments of FIGS. 5, 6, 3A, and 8 adopt plural sets of stripes respectively having different extending directions to spoil the periodicity of each other. As a result, even if the observing solid angle θ1 of the human eye observing one set of the stripes extending along a single direction is greater the solid angle corresponding to the contrast sensitivity, or even if the smallest solid angle at which the human eye can recognize the stripes under a certain contrast condition is smaller than the observing solid angle θ1, the naked eye is still harder to recognize moiré.

Figure 11:
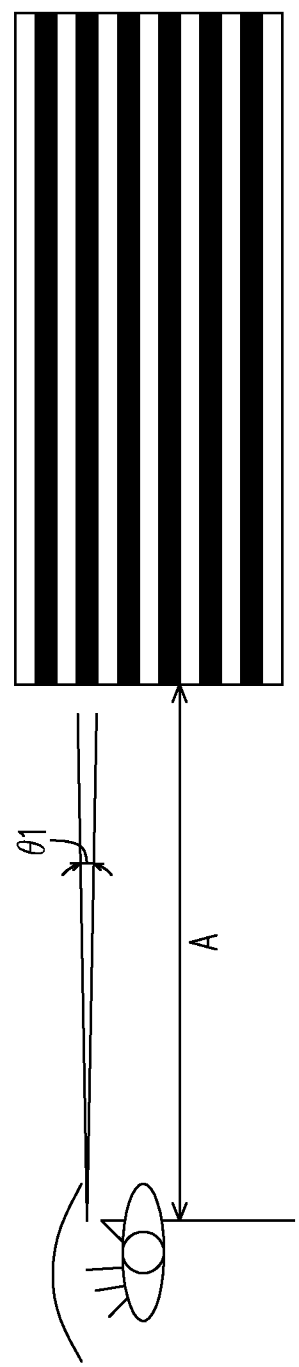
FIG. 11 is a distribution diagram of moiré degree caused by two periodical structures at different included angles and different periodical ratios.

FIG. 11 is a distribution diagram of moiré degree caused by two periodical structures at different included angles and different periodical ratios. Referring to FIG. 11, the horizontal axis refers to the included angle of the two periodical structures, and the vertical axis refers to the periodical ratios between the two periodical structures. The numbers on the curves in FIG. 11 refers to the degree of moiré. The larger this number is, the higher the degree of moiré is. The relationship between the stripes of the above embodiments of the disclosure and other periodical structures, e.g. the pixel array of the display panel, may be designed to fall within the area where the above-mentioned numbers are smaller, so as to improve the quality and uniformity of the displaying frames.

Figure 12A:
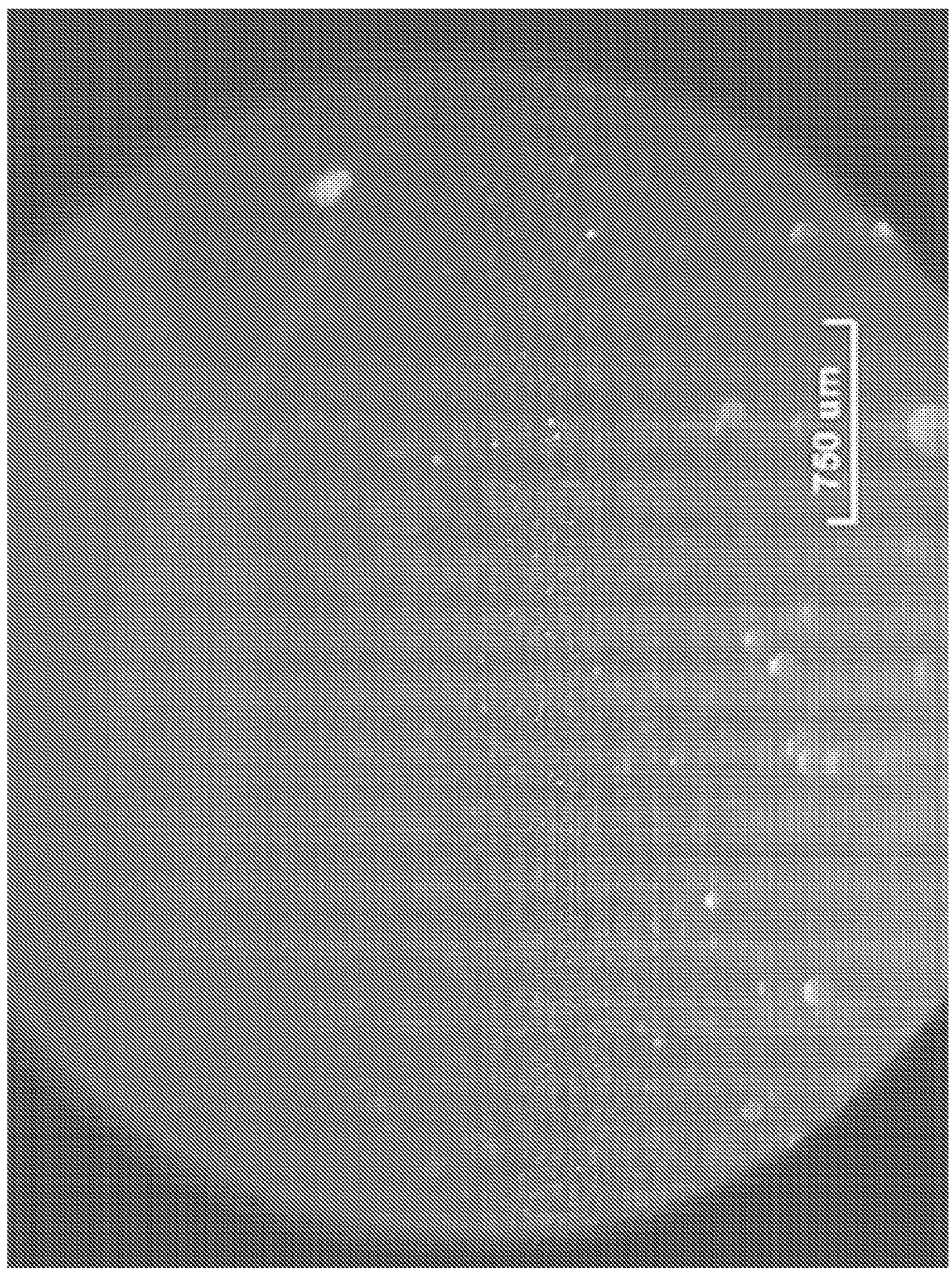
FIGS. 12A through 12G are optical microscopic views of the stripes.
Figure 12B:
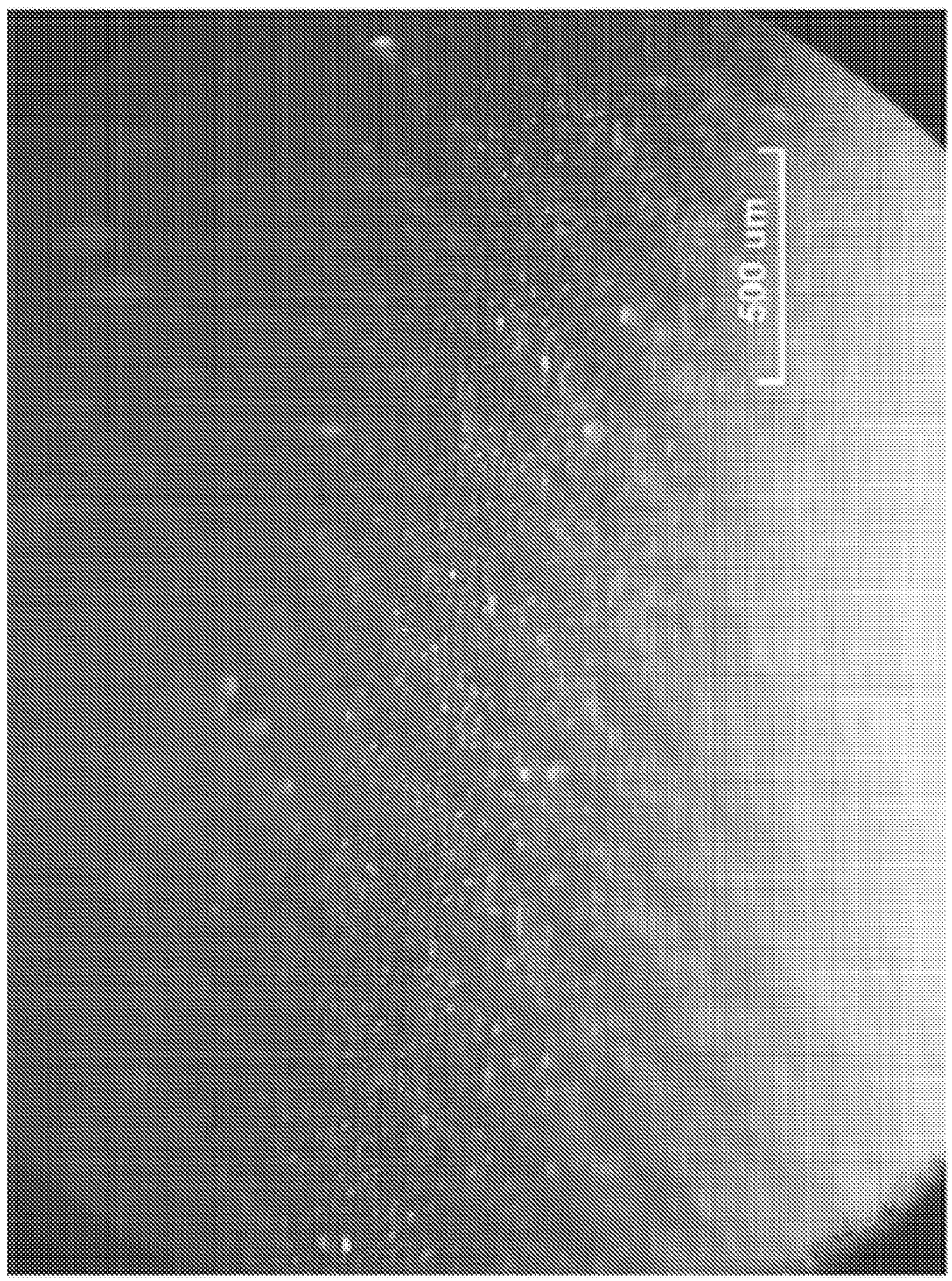
Figure 12C:
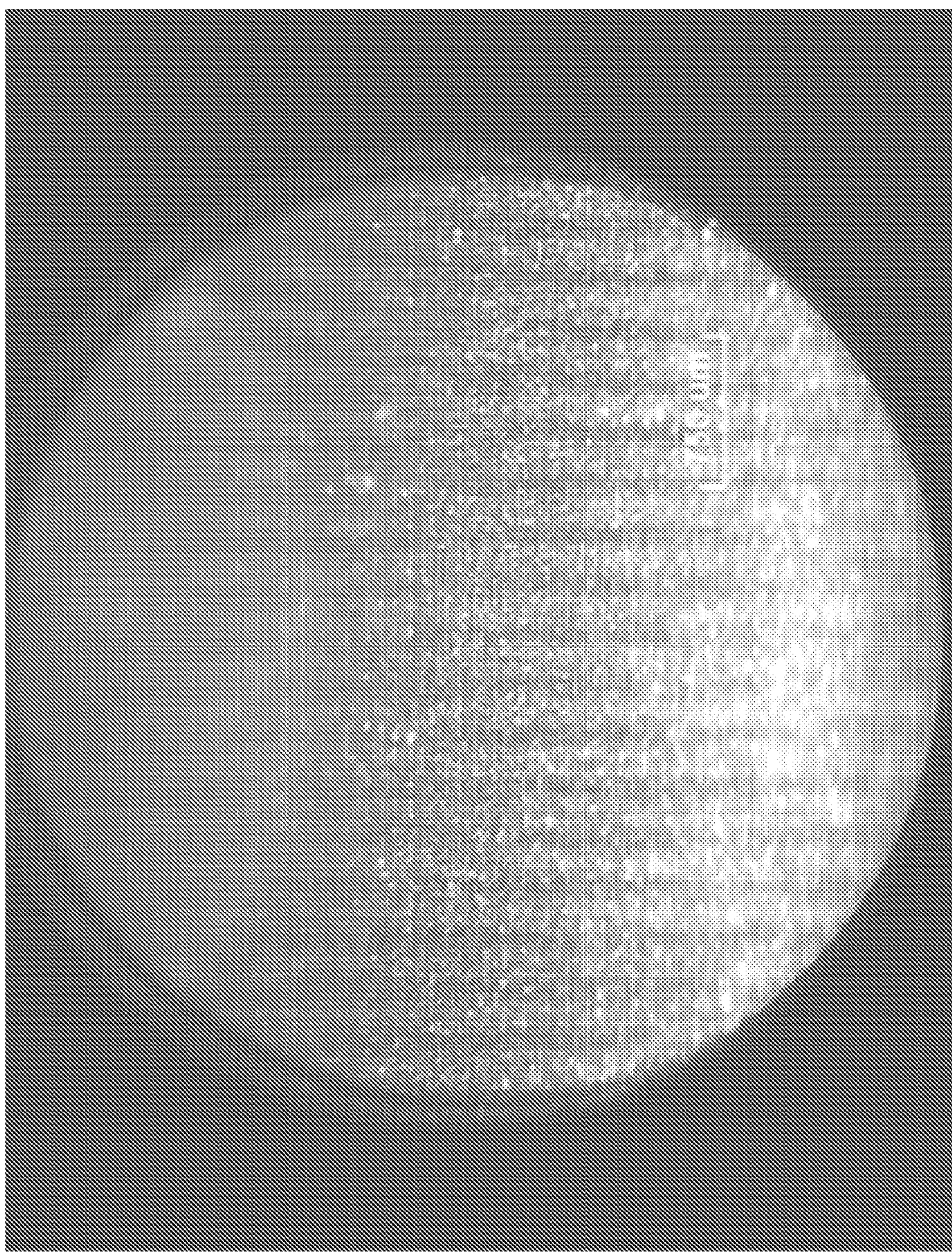
Figure 12D:
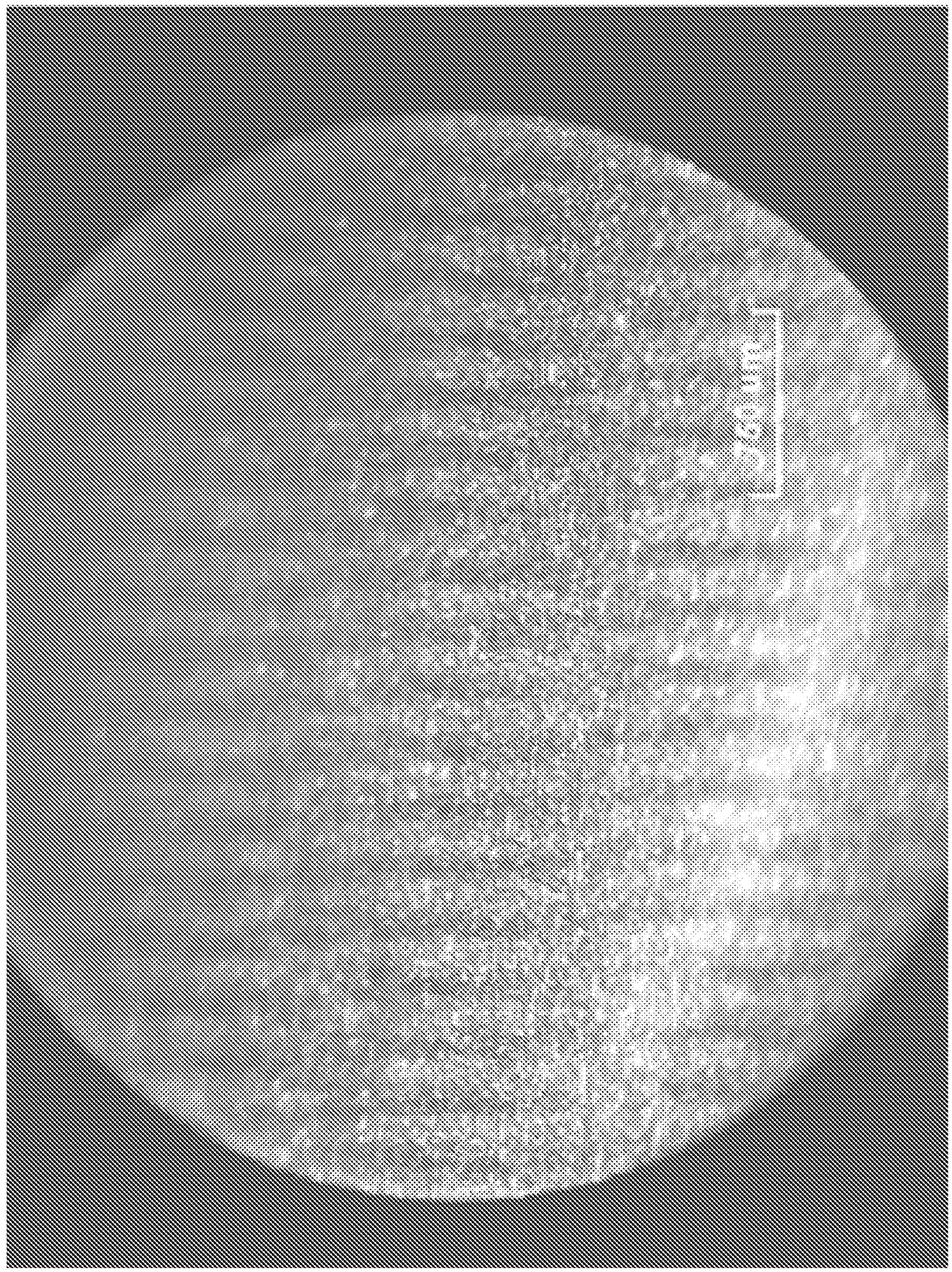
Figure 12E:
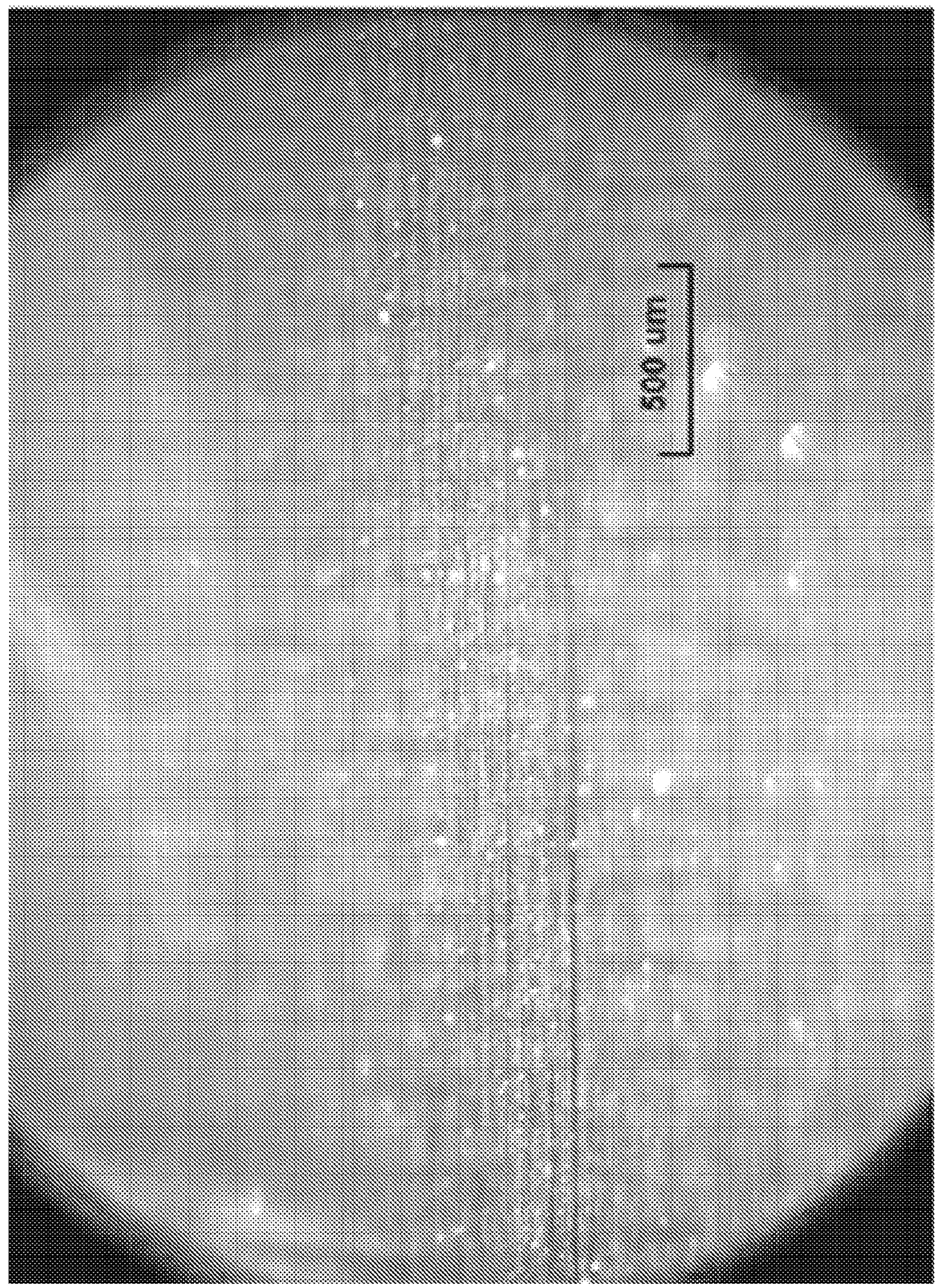
Figure 12F:
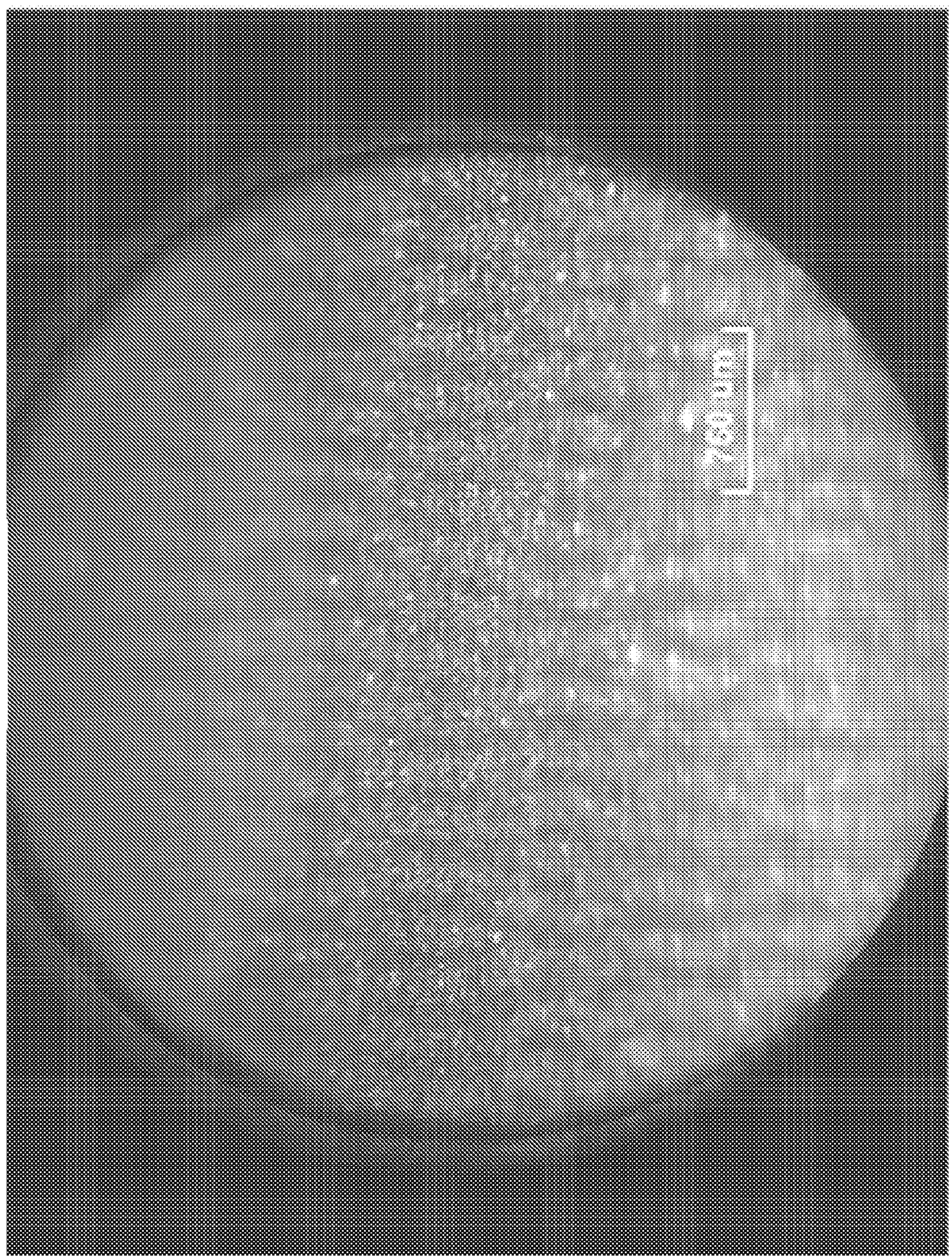
Figure 12G:
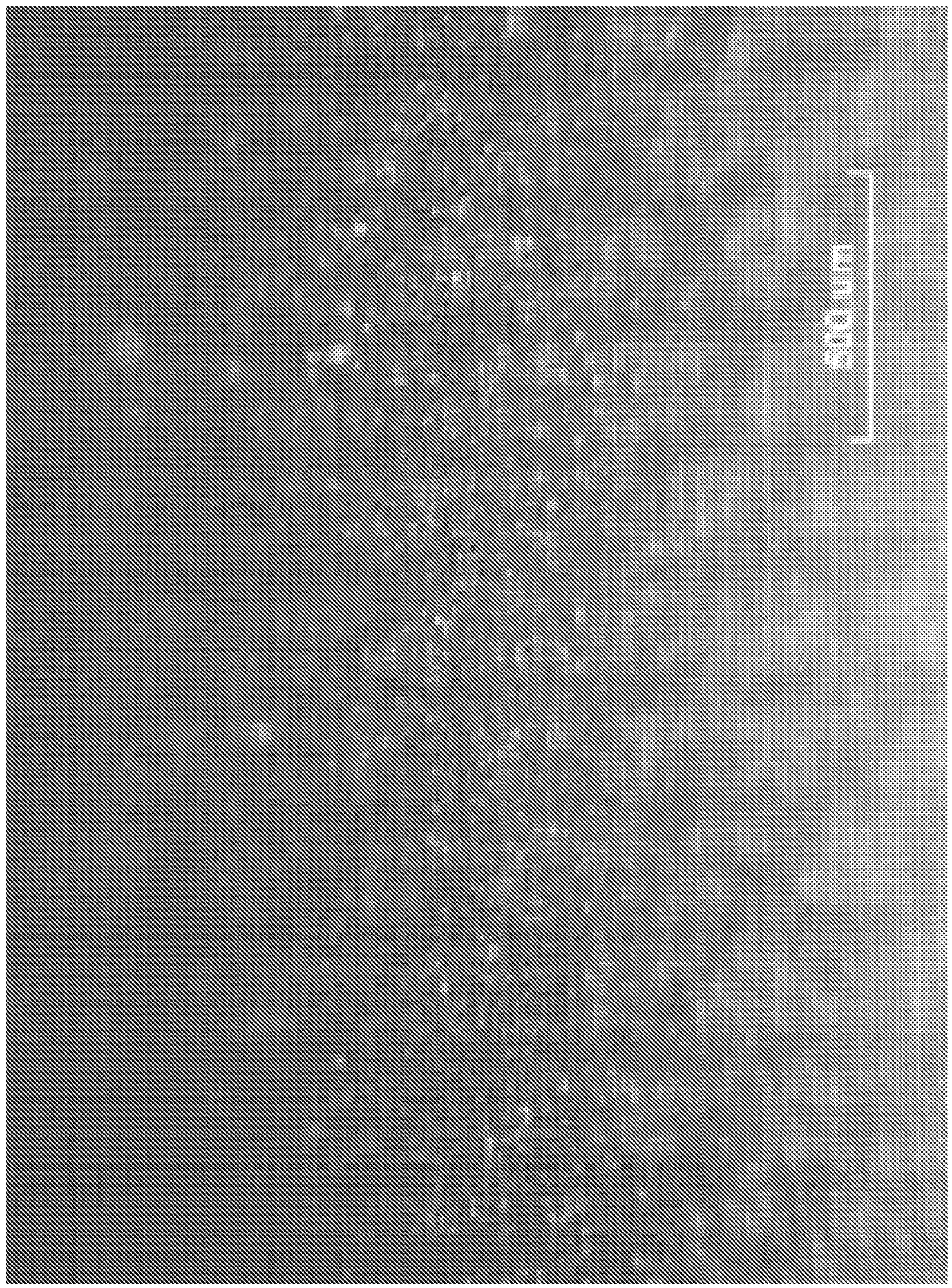

FIGS. 12A through 12G are optical microscopic views of the stripes, and the real size of the stripes can be known from the scale bars in the figures. Referring to FIG. 12A, FIG. 12A is a magnified view of the film when the stripes is perpendicular to the reference direction D1 of FIG. 1. The stripes in FIG. 12A are rather obvious. FIG. 16 is a magnified view of the light transmissive film 200 formed in the embodiment of FIGS. 1 through 4, wherein θ=45 degrees. The stripes are less obvious in this figure. FIG. 12C is a magnified view of the light transmissive film 200' formed in the embodiment of FIGS. 5 through 6, and θ=3 degrees and ϕ=−3 degrees. FIG. 12D is a magnified view of the light transmissive film 200' formed in the embodiment of FIGS. 5 through 6, and θ=5 degrees and ϕ=−5 degrees. FIG. 12E is a magnified view of the light transmissive film 200' formed in the embodiment of FIGS. 5 through 6, and θ=8 degrees and ϕ=−8 degrees. The stripes are very non-obvious in this figure even though the stripes are observed by an optical microscope. FIG. 12F is a magnified view of the light transmissive film 200' formed in the embodiment of FIGS. 5 through 6, and θ=10 degrees and ϕ=−10 degrees. The stripes are very non-obvious in this figure even though the stripes are observed by the optical microscope. FIG. 12G is a magnified view of the light transmissive film 200" formed in the embodiment of FIGS. 7 through 8, and θ=45 degrees, ϕ=−45 degrees, and the extending direction L3 is inclined with respect to the reference direction R1 by zero degree. The stripes are very non-obvious in this figure even though the stripes are observed by the optical microscope.

It should be noted that the disclosure does not limit the number of sets of the stripes having different extending directions formed by the manufacturing method of the light transmissive film or owned by the light transmissive film to be three or less. In other embodiments, four sets or more of the stripes having different extending directions may be formed or used.

In view of the above, in the embodiment of the disclosure, since the first stripes are neither perpendicular nor parallel to the reference direction, the first stripes formed by the manufacturing method of the light transmissive film and the first stripes of the light transmissive film are not easy to cause obvious moiré with other periodical structures. In addition, in the embodiments of the disclosure, since two sets or more of stripes having different extending directions are formed and used to spoil the periodicity of each other, the stripes formed by the manufacturing method of the light transmissive film and the stripes of the light transmissive film are harder to recognized by the naked eye.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A light transmissive film, comprising:

an electrically conductive film including a plurality of nano-units;

wherein the electrically conductive film includes a stripe area and a non-stripe area, the stripe area comprising a plurality of first stripes parallel to each other and periodically arranged at equal intervals on a surface of the film, wherein the first stripes are neither perpendicular nor parallel to a main conductive direction of the electrically conductive film;

wherein the stripe area and the non-stripe area have different densities of the nano-units disposed on the electrically conductive film; and wherein the electrically conductive film has anisotropic impedance.

2. The light transmissive film according to claim 1, wherein the stripe area and the non-stripe area have physical difference.

3. The light transmissive film according to claim 1, wherein the stripe area and the non-stripe area have optical difference.

4. The light transmissive film according to claim 1, wherein the film comprises carbon nanotube.

5. The light transmissive film according to claim 1, wherein the non-stripe area include the intervals and at least a part of the non-stripe area is disposed between the first stripes.

6. The light transmissive film according to claim 1, wherein each of the plurality of first stripes is formed by an energy beam striking the film and extends from one side of the film to another side of the film, wherein the non-stripe area is not struck by the energy beam.

7. A touch display panel, comprising:

a pixel array;

a light transmissive film comprising an electrically conductive film;

wherein the electrically conductive film includes a plurality of nano-units;

wherein the electrically conductive film includes a stripe area and a non-stripe area, the stripe area comprising a plurality of first stripes parallel to each other and periodically arranged at equal intervals on a surface of the film, wherein the first stripes are neither perpendicular nor parallel to a main conductive direction of the electrically conductive film;

wherein the stripe area and the non-stripe area have different densities of the nano-units disposed on the electrically conductive film;

wherein the electrically conductive film has anisotropic impedance.

8. The light transmissive film according to claim 1, further comprising a plurality of second stripes parallel to each other on the surface of the film, wherein each of the second stripes is not parallel to each of the first stripes.

* * * * *